(12) United States Patent
Ardouin

(10) Patent No.: US 6,257,259 B1
(45) Date of Patent: Jul. 10, 2001

(54) REMOVABLY MOUNTABLE LATERALLY EXTENSIBLE FRAME

(76) Inventor: Kenneth Ardouin, 1180 Edwards Pl., Goleta, CA (US) 93117

(*) Notice: Subject to any disclaimer, the term of this patent is extended or adjusted under 35 U.S.C. 154(b) by 0 days.

(21) Appl. No.: 09/275,626

(22) Filed: Mar. 24, 1999

(51) Int. Cl.7 .................................................. E04H 15/06
(52) U.S. Cl. ..................... 135/88.07; 135/96; 296/163; 4/516; 4/518; 4/527; 4/597; 4/616; 224/309; 224/321; 224/328
(58) Field of Search .......................... 135/88.07, 88.05, 135/88.01, 902, 96; 224/328, 309, 314, 315, 319, 320, 321, 324; 414/462; 4/516, 527, 518, 597, 616; 296/163

(56) References Cited

U.S. PATENT DOCUMENTS

| | | | |
|---|---|---|---|
| 1,368,237 | * | 2/1921 | Brockman . |
| 2,204,432 | * | 6/1940 | Morgadanes . |
| 3,018,783 | * | 1/1962 | Tyson . |
| 3,143,123 | * | 8/1964 | Boor . |
| 3,174,536 | * | 3/1965 | Francis . |
| 3,186,420 | * | 6/1965 | Magee . |
| 3,952,758 | * | 4/1976 | Addison et al. . |
| 3,957,301 | * | 5/1976 | Huber . |
| 4,081,095 | * | 3/1978 | Wilburn et al. . |
| 4,364,133 | * | 12/1982 | Gunter . |
| 5,381,814 | * | 1/1995 | Brandon . |

* cited by examiner

Primary Examiner—Robert Canfield
(74) Attorney, Agent, or Firm—Kenneth L. Stein (57) ABSTRACT

There is disclosed herein a multipurpose frame for use with a top mounted vehicle rack wherein the frame telescopingly attaches to the rack. As such, the frame is laterally extensible from the side of the vehicle and may be used to support a canopy, shower or serve as a clothes line or rain catch.

A canopy may be attached at the outside ends of a plurality of extensions attached to the frame. The extensions may be removably attachable at the mounting portions of the frame of the present invention. In this fashion the canopy is sturdily supported by the extensions and can provide shade and protection from the elements to one who remains beneath it. Side walls may be attached to the frame to provide additional protection as well.

5 Claims, 6 Drawing Sheets

REMOVABLY MOUNTABLE LATERALLY EXTENSIBLE FRAME

BACKGROUND OF THE INVENTION

1. Field of the Invention

The present invention generally relates to accessory equipment for vehicles. More particularly, the present invention relates to mountable carrying frames. Even more particularly, the present invention relates to a multipurpose mountable carrying frame for vehicles.

2. Description of the Related Art

For years, vacationers and adventurers have taken their vehicles and traveled on road-trips. These trips may include some camping, sightseeing and offroading, as well as a host of other activities. Oftentimes the vacationers may find themselves away from the conveniences of a hotel or bathroom, such as when camping.

As is well known in these instances, tents or the vehicle itself are generally employed to provide protection from the sun and weather. During the day, a tent or the interior of the vehicle may afford the only escape from the rays of the sun or inclement weather. The inside of a tent may be uncomfortable due to it's size and restricted environment. The vehicle may have substantially the same drawbacks.

Additionally, and especially when away for an extended period of time, campers may need to shower and to do so may hang a plastic bag filled with water from a tree as a water source for taking a shower. This can be a difficult task as the water bag is flimsy and may be punctured if dropped. Additionally, it can be difficult to hang the bag from a tree depending upon the height of the branches. It may also be the case that there are no trees available to hang the bag from and as such, this method is not available.

There have heretofore been provided canopies that attach to the side of a vehicle to provide shade and protection from the elements. One such canopy is disclosed in U.S. Pat. No. 5,381,814. In this patent there is disclosed a canopy that rolls up inside a container that is attached atop a vehicle. Although this canopy may provide protection from the elements, it does not have a sturdy frame and as such may be damaged or destroyed in a windy environment. Additionally, the disclosed canopy is not designed to provide any functionality other than that of a canopy and is configured to mount to the top of a long vehicle such as a minivan or utility vehicle, but is not designed to mount atop of a smaller car such as a midsize or compact auto.

Therefore, what is needed in the art is a multifunctional frame that may attach to the top of various sized vehicles. The frame should be configurable and removable so that it can mount to the top of a long vehicle, such as a minivan, or to a smaller vehicle such as a subcompact car.

It is to the solutions of these problems to which the present invention is directed.

SUMMARY OF THE INVENTION

The present invention provides a laterally entesible frame for attachment to a vehicle roof-top rack having a pair of hollow cross-bars, said frame comprising:

a pair of spaced apart mounting bars, each of said pair of spaced apart mounting bars telescopingly seated within a corresponding one of the pair of cross-bars, each mounting bar having an outside end.

The present invention provides a multipurpose frame for use with a top mounted vehicle rack wherein the frame telescopingly attaches to the rack. As such, the frame is laterally extensible from the side of the vehicle and may be used to support a canopy, shower or serve as a clothes line or rain catch.

A canopy may be attached at the outside ends of a plurality of extensions which are mounted to the frame. The extensions may be removably attachable at the mounting portions of the frame of the present invention. In this fashion the canopy is sturdily supported by the extensions and can provide shade and protection from the elements to one who remains beneath it.

The frame is adjustable with respect to length and width and as such, the frame will fit on vehicles and will provide clearance such that one may sit beneath the canopy or stand beneath a shower supported therefrom. Additionally, the canopy in accordance with the present invention may be used to collect rain water.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
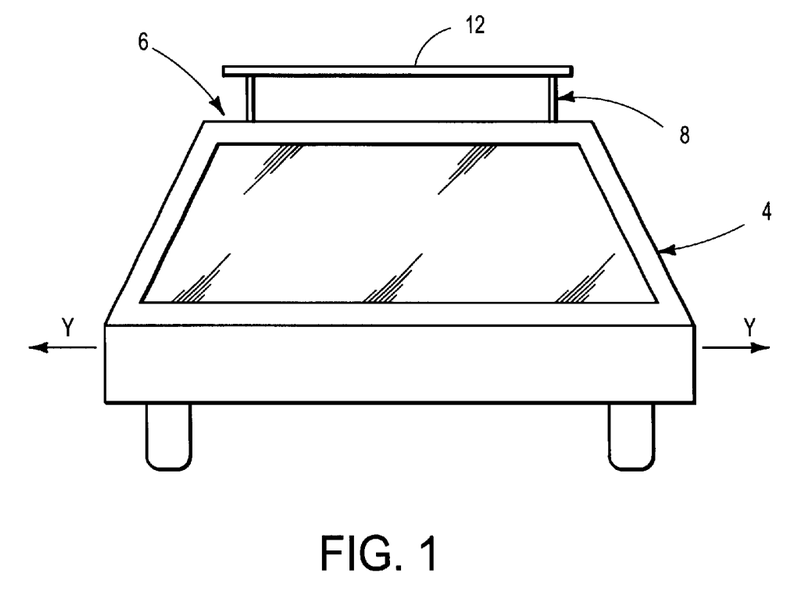
FIG. 1 is a rear plan view of a vehicle having a roof mounted rack mounted thereupon.
Figure 2:
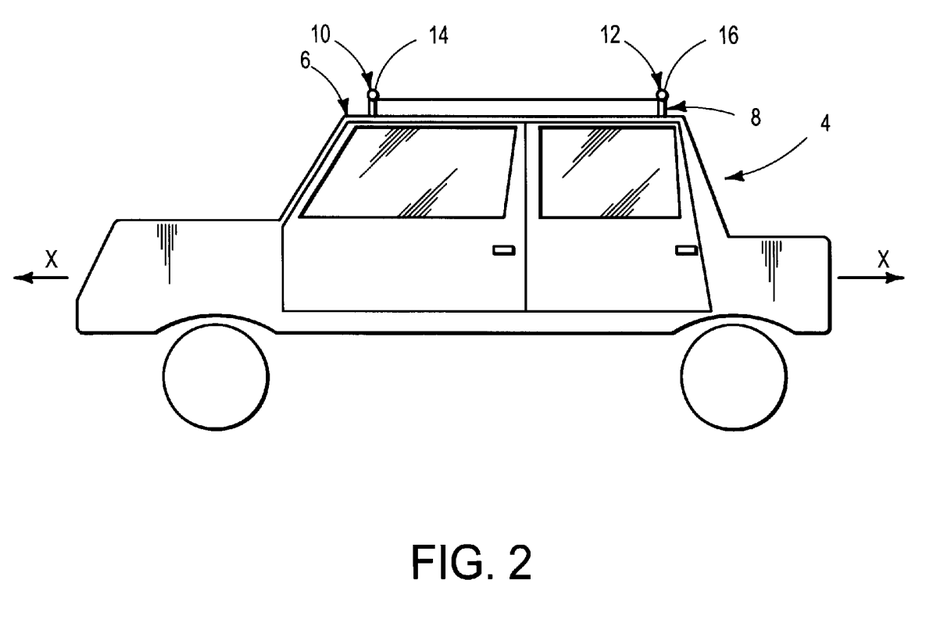
FIG. 2 is side plan view of a vehicle having a roof mounted rack mounted thereupon.

Referring to the drawings more particularly by reference numbers, FIGS. 1 and 2 depict a vehicle 4 having a roof 6. The vehicle 4 has a longitudinal or length-wise axis X and a lateral or width-wise axis Y. Upon the roof 6 there is mounted a carrying rack 8. The carrying rack 8 includes two cross-bars 10, 12. Each of the cross-bars 10, 12 are tubular and has a hollow interior 14, 16. As such, each of the cross-bars 10, 12 may serve as a telescoping housing for similarly configured bars that have a smaller circumference permitting insertion into each of the cross-bars 10, 12.

It is well-known for the cross bars 10, 12 to be cylindrical, or to have a square cross-sectional shape. Carrying racks produced by Yakima, such as those having the trade names Q Towers™ or HiRise Towers™, may be used with cylindrical cross-bars. For convenience, the cross-bars 10, 12 depicted are cylindrical, however it is to be appreciated that these cross-bars may have a square cross-sectional shape, or other cross-sectional shape, as well. The cross-bars 10, 12 of the rack 8 extend in parallel with the width-wise axis Y of the vehicle 4.

Figure 3:
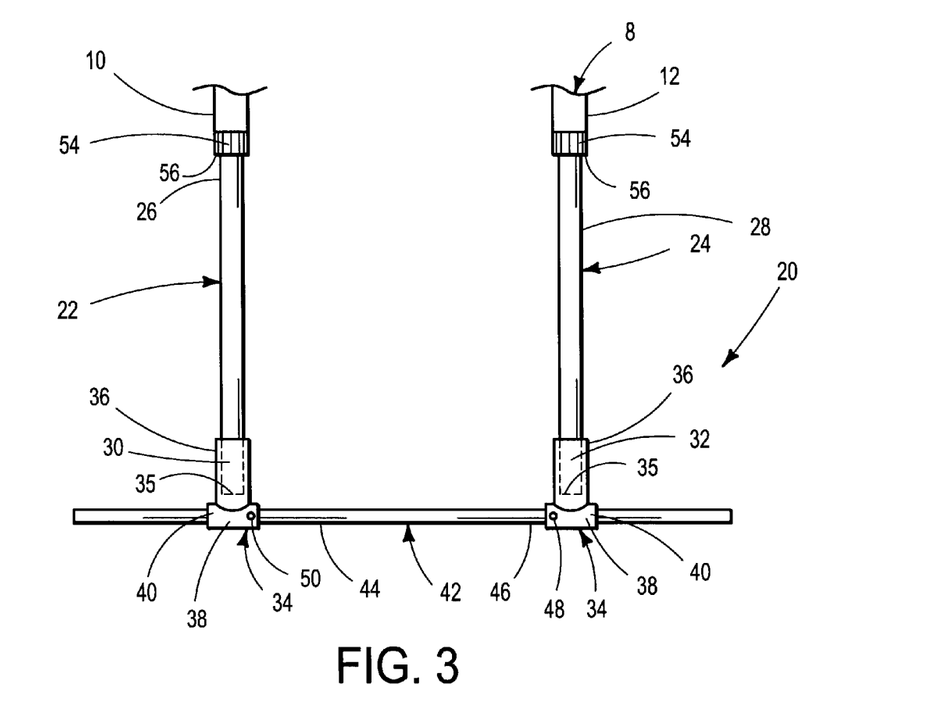
FIG. 3 is a top plan view of a laterally extensible frame in accordance with the present invention , the frame attached to a roof rack and in an extended configuration.

FIG. 3 depicts a frame 20 mounted to the carrying rack 8 at each of the cross-bars 10, 12. The frame 20 includes a pair of mounting bars 22, 24. Each of the mounting bars 22, 24 has an inside end 26, 28 and an outside end 30, 32. Each of the pair of mounting bars 22, 24 has a diameter less than the inside diameter of an associated cross-bar 10, 12 and each is telescopingly seated therein.

The mounting bars 22, 24 are slidable within the associated cross-bars 10, 12 and may be moved laterally with respect to the vehicle 4, or parallel with the lateral axis Y. The frame 20 is in an extended configuration when the mounting bars 22, 24 have their inside ends 26, 28 disposed adjacent an associated one of the cross-bars 10, 12, as depicted in FIG. 3. Attached to each of the mounting bars 22, 24 at their outside ends 30, 32 is a corner joint 34. Each corner joint 34 has a substantially hollow interior 35 and integrally includes a mounting bar mounting portion 36 and an attaching bar mounting portion 38.

In the preferred embodiment, the interior of the corner joint 34 at the mounting bar mounting portion 36 and the attaching bar mounting portion 38 interiorly has the same cross-sectional shape as an associated mounting bar 22 or 24 and attaching bar 42. Additionally, the mounting bar mounting portion 36 and the attaching bar mounting portion 38 are configured to slidably receive and house a respective attaching bar or mounting bar. At the interior 35 of the corner joint 34 the mounting bar mounting portion 36 and the attaching bar mounting portion 38 include recesses which are disposed orthogonally. In the preferred embodiment, the recess of the attaching bar mounting portion 38 extends entirely through the corner joint 34 thus forming an aperture therethrough. In this fashion an attaching bar 42 may extend between and pass through each of two corner joints 34 disposed at the ends 44, 46 thereof.

The attaching bar 42 extends between each of the mounting bars 22, 24 and forms substantially a right angle with each of the mounting bars 22, 24. The attaching bar 42 has ends 44, 46 which are slidably received by each of the attaching bar mounting portions 38 on each corner joint 34. The ends 44, 46 of the attaching bar are held in place by some attaching mechanism such as a spring biased detent 48 disposed at each of the outside ends which is received by an aperture 50 extending from the exterior 52 of the corner joint 34 to the interior 35 thereof. Alternatively, each aperture 50 may be threaded and a screw, not depicted, may be used to retain the attaching bar 42 in place. In this fashion the attaching bar 42 may be of substantially any length and will appropriately seat through each corner joint 34, providing adjustability for the rack 20.

The recess of the mounting bar mounting portion 36 extends towards the recess of the attaching bar mounting portion 38, but does not intersect it. As such, each mounting bar 22, 24 may be housed in the recess and temporarily mounted therein vie a an aperture and screw as disclosed hereinabove, a spring biased detent and aperture, or the like. Additionally, each mounting bar 22, 24 will not interfere with the adjustability of the attaching bar 42.

Figure 4:
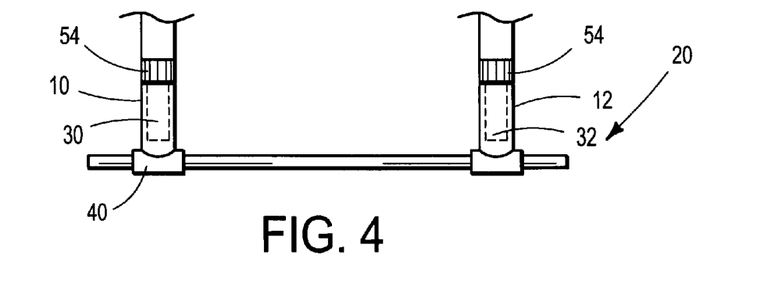
FIG. 4 is a top plan view of the laterally extensible frame attached to a roof rack and in a retracted configuration.

FIG. 4 depicts the frame 20 in a retracted configuration. In such a configuration, each of the outside ends 30, 32 of the mounting bars 22, 24 are disposed interiorly an associated corner joint 34 and each corner joint is disposed adjacent an associated cross-bar 10, 12. In this configuration, the vehicle 4 may be driven safely. A clasping mechanism or hook and loop fastening, such as Velcro® fastening, or some other suitable fastener such as a collet and collar assembly where the collet is attached to at least one of the cross-bars 10, 12. The collet and collar assembly or other clasping mechanism may be used for temporarily maintaining the retracted configuration may be employed.

As shown in FIG. 4, the collar 54 is disposed at the end of each of the cross bars 10, 12. The collet 56 is disposed at the interior of the collar 54. When the frame 20 is in the retracted configuration the collar 54 may be turned clockwise to tighten the collet 56 to temporarily maintain the retracted configuration and guard against the frame 20 accidentally sliding into the extended configuration.

Figure 5:
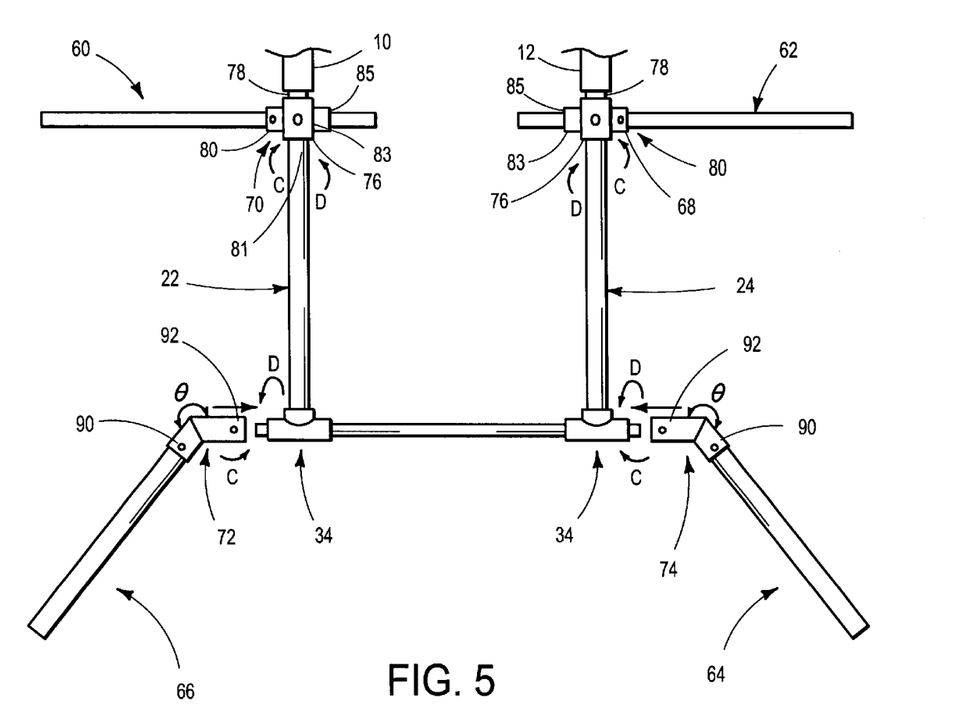
FIG. 5 is a top plan partial break-out view of the laterally extensible frame attached to a roof rack, the frame in an extended configuration and having a pluarlity of extensions attached thereto.

In FIG. 5 there is depicted the frame 20 in accordance with the present invention further having proximal extension bars 60, 62 and distal extension bars 64, 66, attached thereto. Each of the extension bars 60, 62, 64, 66 may be of substantially any length, although a maximum length of four feet is preferable. The proximal extension bars 60, 62 are disposed in close proximity to the vehicle 4 while the distal extension bars 64, 66 are disposed in close proximity to the ends 30, 32 of the mounting bars 22, 24. Each of the proximal extension bars 60, 62 and the distal extension bars 64, 66 have substantially the same length which facilitates manufacture of the rack 20.

Additionally, each proximal extension bar 60, 62 engages an associated proximal extension joint 68, 70, and each distal extension bar 64, 66 engages a distal extension joint 72, 74. The proximal extension joints 68, 70 are substantially identical in their configuration and the distal extension joints 64, 66 are also substantially identical.

Figure 6:
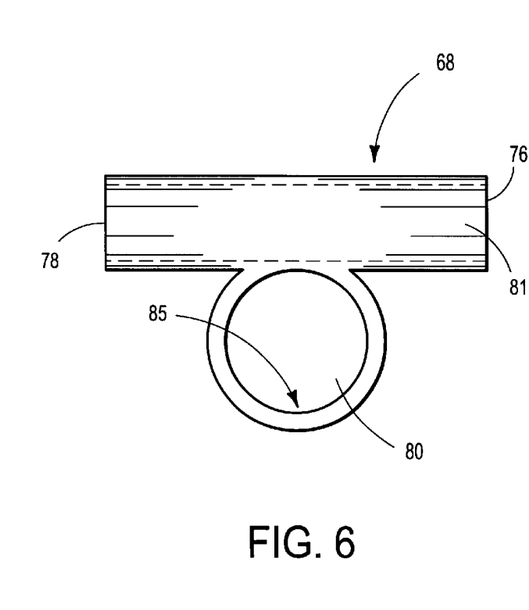
FIG. 6 is a plan view of the proximal extension joint as included in the preferred embodiment.

As depicted in FIG. 6, each proximal extension joint 60, 62 has a hollow interior and a proximal side 78, a distal side 76, an external side 80 and an internal side 83. A mounting bar aperture 81 extends between the proximal side 78 and the distal side 76 and has a diameter slightly greater than the outside diameter of each of the mounting bars 22, 24. In this fashion, a mounting bar 22, 24 may be slidably received through the aperture such that the proximal extension joint 68, 70 can slide on a respective mounting bar 22, 24. A proximal extension bar aperture 85 extends between the external side 80 and the internal side 83 and is disposed below or above the mounting bar aperture 81. As such each proximal extension bar 60, 62 may be slidably seated within a corresponding proximal extension bar aperture 85. An aperture extending to the interior may be used in conjunction with a screw to tighten each respective proximal extension bar 60, 62 in place.

Each proximal extension joint 68, 70 may be temporarily affixed in place through the use of a threaded aperture and a screw. The screw may be tightened against the mounting bar 22, 24 such that the proximal extension joint will not move. In this way, a proximal extension joint 68, 70 and its associated proximal extension bar 60, 62 may be angled upwardly or downwardly, the advantages if which will become apparent hereinbelow.

A proximal extension bar 60, 62 is received in the proximal extension aperture 85 and may be removably affixed in place through the use of a spring biased detent and aperture as was disclosed herein with respect to the attachment of the corner joint. Alternatively, a threaded aperture and screw may be used to affix a proximal extension bar 60, 62 within an associated proximal extension joint 68, 70.

Figure 7:
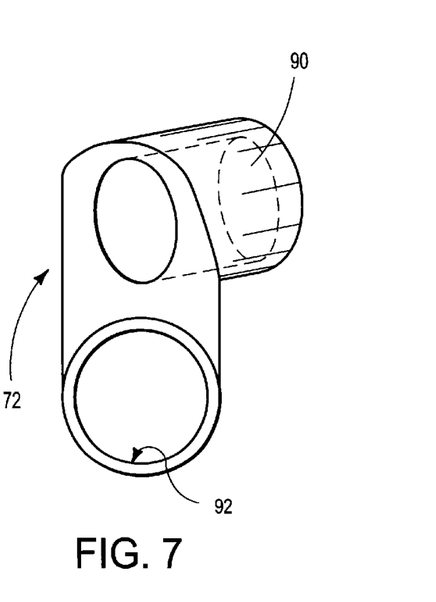
FIG. 7 is a plan view of the distal extension joint as included in the preferred embodiment.
Figure 8:
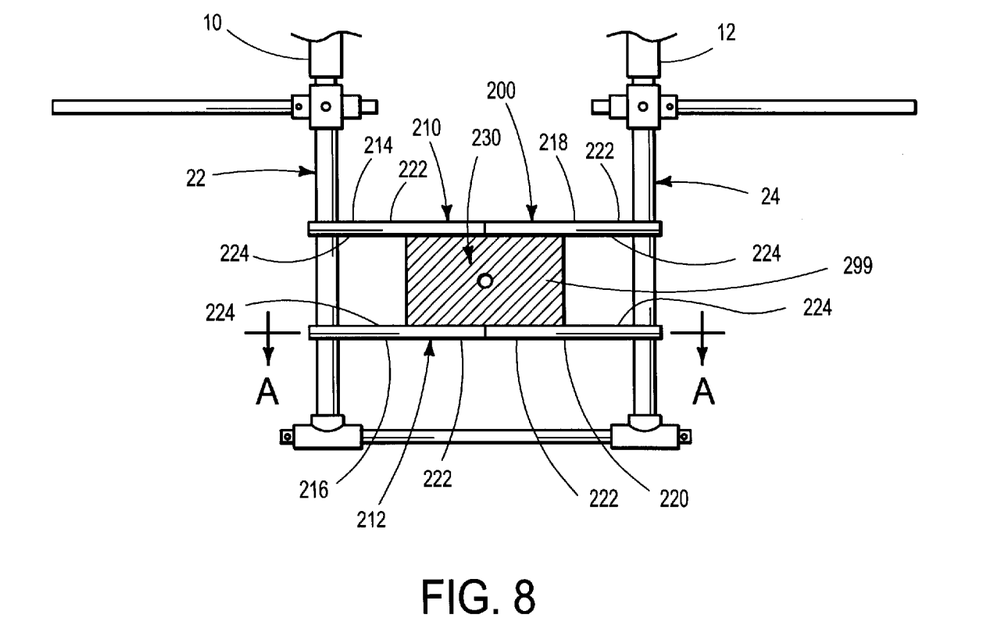
FIG. 8 is a top plan view of the laterally extensible frame attached to a roof rack, the frame in an extended configuration and having an upwardly extendable shower attachment mounted thereupon, the shower attachment in a lowered configuration.
Figure 9:
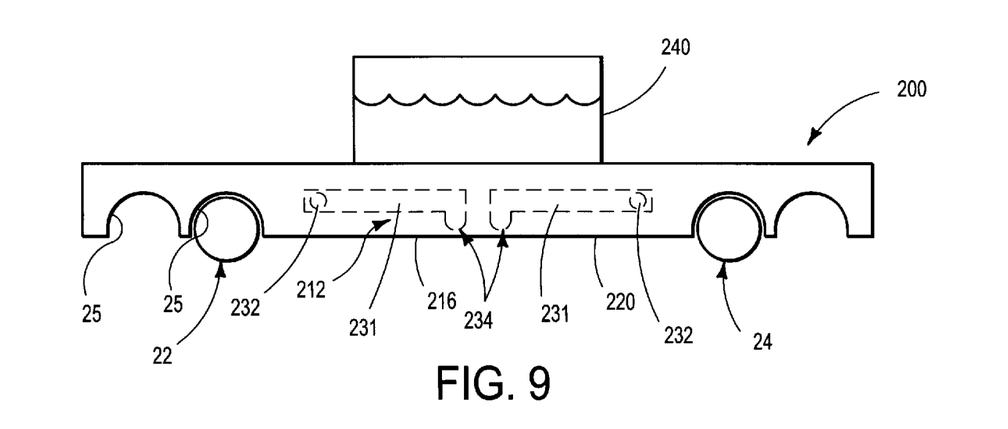
FIG. 9 is a side plan view of the shower attachment taken along A—A as depicted in FIG. 8.
Figure 10:
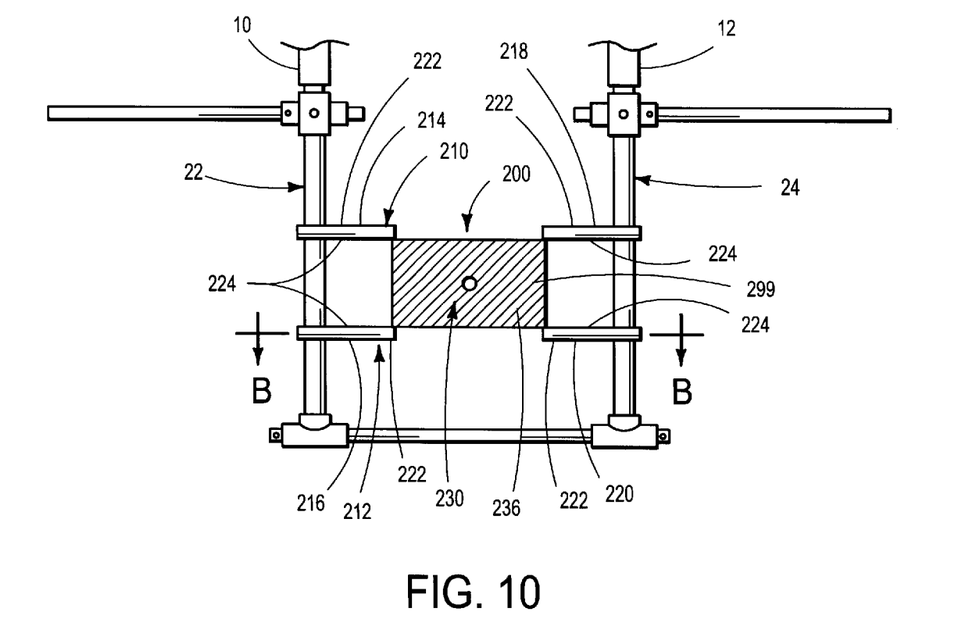
FIG. 10 is a top plan view of the laterally extensible frame attached to a roof rack, the frame in an extended configuration and having an upwardly extendable shower attachment mounted thereupon, the shower attachment in a raised configuration.
Figure 11:
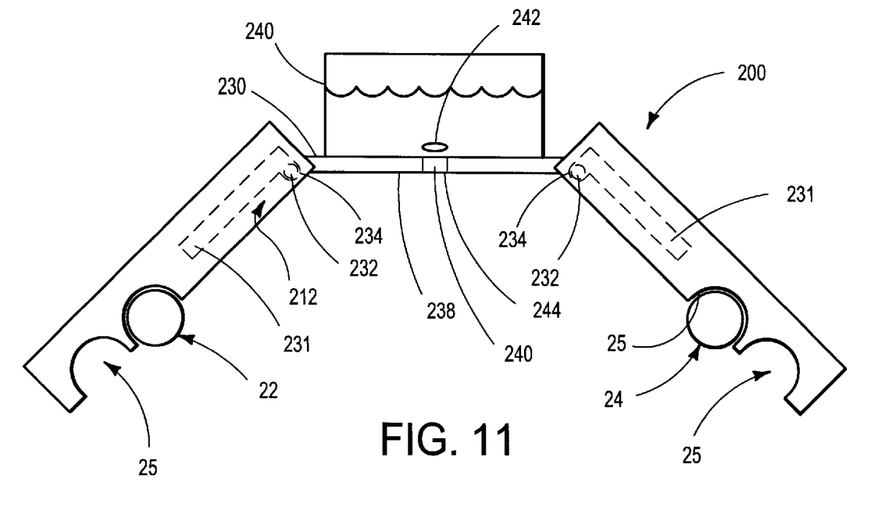
FIG. 11 is a side plan view of the upwardly extensible shower attachment taken along B—B as depicted in FIG. 10.

As depicted in FIG. 7, each distal extension joint 72, 74 is removably mounted to an the extension bar 42 somewhere along the length thereof. In the preferred embodiment, each distal extension joint 72, 74 includes a distal extension bar aperture 90 and an attaching bar aperture 92. The distal extension bar aperture 90 and the attaching bar aperture 92 are offset at an angle theta and the attaching bar aperture 92 is disposed below or above the distal extension bar aperture 90, although this may be reversed.

By offsetting the apertures by an angle theta, each of the distal extension bars will create a greater area for a canopy to cover. This will be described hereinbelow in more detail. Theta may generally range from about 180 degrees to 100 degrees. However it is to be appreciated that angles of between 60 and 100 may be employed as well. The attaching bar aperture 92 has the attaching bar 42 inserted therein and attached thereto by the hereinabove described screw, or detent and aperture means.

Although not depicted, each distal extension joint may be attached to the attaching bar 42 on either side of a corner joint 34. In this fashion, each respective extension bar 64, 66 may be aligned to provide for removable attaching a standard canopy.

Each distal extension bar 64, 66 is slidably received in the distal extension bar aperture 90 and attached to an associated distal extension joint 72, 74 through the use of an aperture and screw or spring biased detent and aperture, both of which attachment schemes are generally well known in the art of attaching mechanisms.

Figure 12:
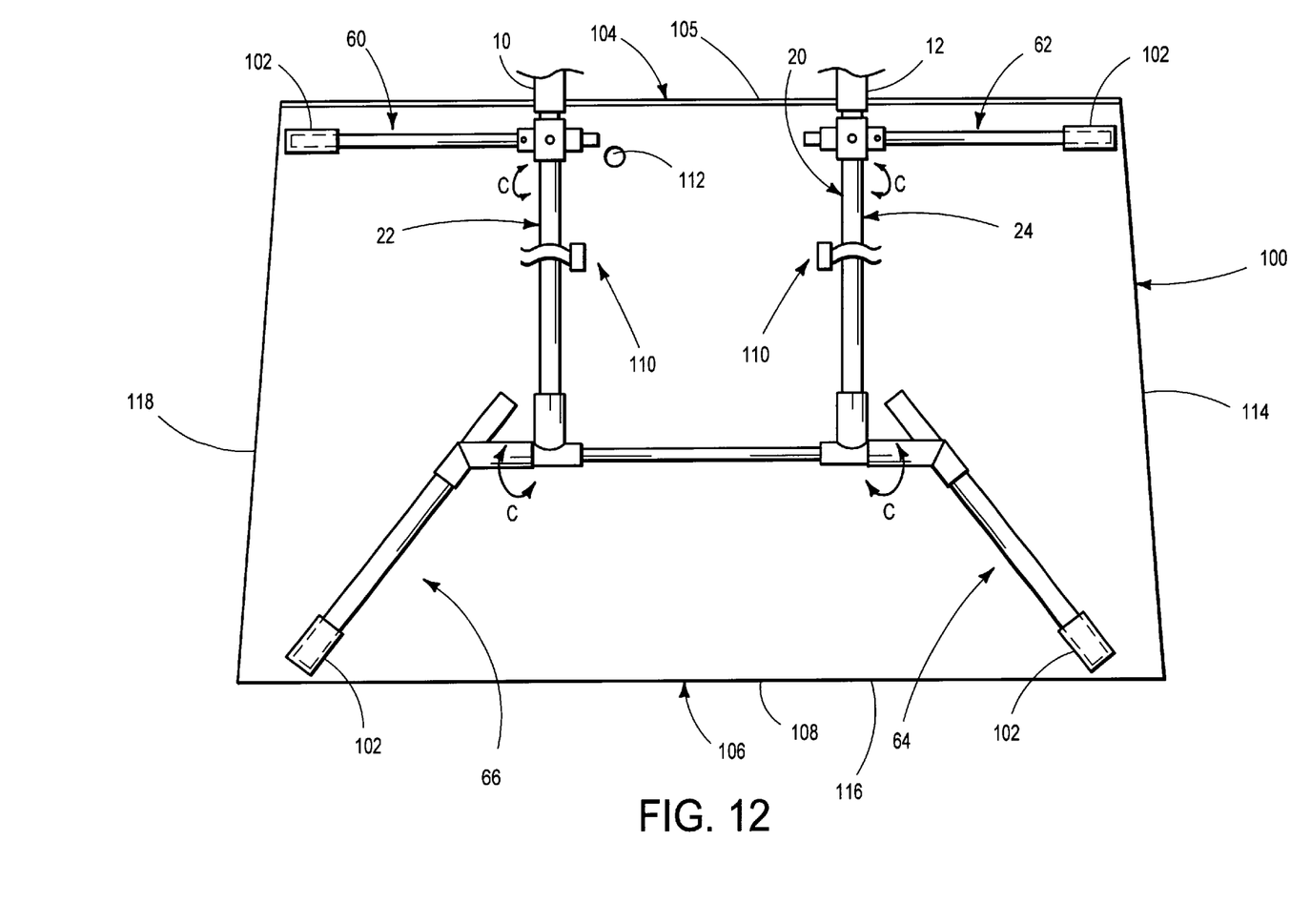
FIG. 12 is a bottom plan view of the laterally extensible frame having a canopy mounted thereto.

As shown in FIG. 12, a canopy 100 may be attached to the frame 20. The canopy 100 has a plurality of pockets 102 which slidably receive an associated end of the proximal and distal extension bars 60, 62, 64, 66. The canopy 100 has a proximal end 104 and a distal end 106. At its proximal end 104 a reinforced shoulder extends upwardly ensuring rain water does not leak between the proximal end of the canopy 100 and the vehicle 4. This ensures that people may enter and exit the vehicle 4 without getting wet. The height of both the proximal end 104 and the distal end 106 is adjustable by rotating the proximal and distal extension joints 68, 70, 72, and 74 in the direction C indicated and affixing each of the joints so that the extension bars are angled upwardly with respect to the ground.

The canopy is preferably formed from some waterproof material such as nylon, plastic or rubber and has a top surface 108 and a bottom surface 110. An aperture 112 extends between the top surface 108 and the bottom surface 110 and is disposed between the mounting bars 22, 24. In this fashion, rainwater may be collected by placing a bucket or other container below the aperture 112. Rain is funneled to the aperture 112 when the canopy 100 is angled upwardly at each of its edges 114, 116, 118. This provides a camper a means for collecting water that would not be available without the frame 20 and canopy 100 in accordance with the present invention.

The canopy 100 may be further removably attached to the frame 20 through the use of a hook and loop fastener, such as Velcro®. The fastener 110 encircles each of the mounting rods 22, 24 and attached the canopy thereto.

The present invention may additionally include a shower mount 200. The shower mount 200, as depicted in FIGS. 8–11 has a lowered configuration and a raised configuration. As such, when someone wishes to take a shower, they may mount the shower mount 200 to the frame 20 and then place the shower mount 200 in the raised configuration. In this way even if the vehicle to which the frame is mounted is low to the ground, a person will be able to stand beneath the shower mount to wash.

The shower mount 200 includes two side rails 210, 212. Each side rail has a first portion 214, 216 and a second portion 218, 220. Each first portion 214, 216 and each second portion 218, 220 have respective outer surfaces 222 and inner surfaces 224. A shower seat 230 is disposed adjacent to and between of the side rails 210, 212.

Each portion 214, 216, 218 and 220 of the side rails 210, 212 rotatably removably seats atop an associated mounting rod 22, 24 through the use of a plurality of notches 25 cut into each portion such that each portion removably seats independent of the space by which the mounting bars 22, 24 are separated.

The shower seat 230 has a plurality of rollers 232. One of the rollers 232 seats in each C-channel 231 disposed at the inner surface 222 of each portion 214, 216, 218, 220. Each C-channel 231 has a well 234 portion and when the shower seat 230 is raised, each portion 214, 216, 218, 200 rotates relative to the mounting rods 22, 24 until the rollers 232 fall into the well 234 in the C-channel 231. Each of the rollers 232 abuts the well which maintains the raised configuration of the shower seat.

To lower the shower seat 230, the shower seat 230 is simply lifted slightly which moves the rollers 232 up out of the well 234. The shower seat 230 can then be lowered into the lowered configuration.

A shower container 240, which is generally formed from plastic may be seated upon the shower seat 230. The shower seat 230 has a top surface 236 and a bottom surface 238 and an aperture 240 extending between the top surface 236 and the bottom surface 238. The shower container 240 preferably has a lower surface 299 formed from a dark colored plastic. Dark colors absorb radiant energy and this way, the water in the container may be stored in the sun, thus warming the water which is to be used for showering. The shower container 240 may have a stopcock 242 to open and close a spout disposed at the bottom 244 thereof. Additionally, the stopcock may serve to allow air to enter at the top of the container which further enables the function of the shower by allowing more water to run thereout. A person can open the spout, shower and then close the spout.

All of the components of the present invention should be formed from strong durable materials. Such materials may include PVC tubing, or other plastic tubing, alternatively they may be formed from aluminum or some other lightweight durable metal, or graphite or some other durable strong composite material.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A laterally extensible frame in combination with and for attachment to a vehicle roof-top rack having a pair of hollow cross-bars, said frame comprising:

a pair of spaced apart mounting bars, each of said pair of mounting spaced apart mounting bars telescopingly seated within a corresponding one of the pair of cross-bars, each mounting bar having an outside end;

an attaching bar extending between and mounted to each of the pair of spaced apart mounting bars;

a plurality of extension bars attached to the mounting bars;

a canopy mounted to the extension bars; and wherein each of said extension bars is angled upwardly.

2. The frame combination as recited in claim 1 wherein the canopy comprises a top surface, a bottom surface and an aperture extending therebetween.

3. A laterally extensible frame in combination with and for attachment to a vehicle roof-top rack having a pair of hollow cross-bars, said frame comprising:

a pair of spaced apart mounting bars, each of said pair of mounting spaced apart mounting bars telescopingly seated within a corresponding one of the pair of cross-bars, each mounting bar having an outside end; and a shower mount seated atop the mounting bars.

4. The frame combination as recited in claim 3 wherein the shower mount has a lowered configuration and a raised configuration.

5. The frame combination as recited in claim 4 wherein the shower mount comprises a shower seat having an aperture formed therethrough.

* * * * *